(12) United States Patent
Vashina et al.

(10) Patent No.: US 9,622,461 B2
(45) Date of Patent: Apr. 18, 2017

(54) STEERABLE FISHING LURE

(71) Applicants: Gerald Vashina, Macungie, PA (US);
Napoleon Devia, Hellertown, PA (US)

(72) Inventors: Gerald Vashina, Macungie, PA (US);
Napoleon Devia, Hellertown, PA (US)

( * ) Notice: Subject to any disclaimer, the term of this patent is extended or adjusted under 35 U.S.C. 154(b) by 58 days.

(21) Appl. No.: 14/035,357

(22) Filed: Sep. 24, 2013

(65) Prior Publication Data
US 2015/0082682 A1   Mar. 26, 2015

(51) Int. Cl.
| *A01K 85/12* | (2006.01) |
| *A01K 85/00* | (2006.01) |
| *A01K 85/16* | (2006.01) |
| *A01K 91/02* | (2006.01) |
| *A01K 91/03* | (2006.01) |

(52) U.S. Cl.
CPC ............ *A01K 85/00* (2013.01); *A01K 85/16* (2013.01); *A01K 91/02* (2013.01); *A01K 91/03* (2013.01)

(58) Field of Classification Search
CPC ........ A01K 85/00; A01K 85/12; A01K 85/16; A01K 85/18
USPC ...... 43/4.5, 42.03, 42.11, 42.12, 42.2, 42.21, 43/42.22, 42.23, 42.35, 42.49
See application file for complete search history.

(56) References Cited

U.S. PATENT DOCUMENTS

| 1,694,195 | A | * | 12/1928 | Watts | .............................. | 43/26.2 |
| 2,464,465 | A | * | 3/1949 | Steinhauer | ..................... | 43/26.2 |
| 3,978,811 | A | * | 9/1976 | Angus et al. | ................. | 114/245 |
| 5,058,309 | A | | 10/1991 | Firmin | | |
| D396,261 | S | | 7/1998 | Duncan | | |
| 6,122,854 | A | | 9/2000 | Kinnear | | |
| 7,316,095 | B1 | * | 1/2008 | Petner et al. | ................ | 43/42.22 |
| 7,627,978 | B2 | * | 12/2009 | Davis | ..................... | A01K 85/02 |
| | | | | | | 43/42.03 |
| 8,099,899 | B2 | | 1/2012 | Scott | | |
| 2002/0095854 | A1 | * | 7/2002 | Kinnear | ....................... | 43/42.03 |
| 2010/0011653 | A1 | * | 1/2010 | Barczak et al. | ............. | 43/42.03 |

* cited by examiner

*Primary Examiner* — Lisa Tsang
(74) *Attorney, Agent, or Firm* — Joseph E. Maenner; Maenner & Associates, LLC

(57) ABSTRACT

A steerable fishing lure with highly improved steerability is disclosed. The fishing lure has a generally hollow body having an inner surface and a generally tubular cam sleeve located inside the body and fixedly attached to the inner surface. The cam sleeve has a forward cam surface and an aft cam surface. A generally cylindrical rotor is slideably inserted into the cam sleeve. The rotor has a forward cam and an aft cam. Each of the forward cam and the aft cam extends outwardly from the rotor such that the forward cam rides along the forward cam surface and the aft cam rides along the aft surface. A biasing member is mounted within the body. The biasing member is adapted to bias the forward cam against the forward cam surface. A method of redirecting a track of the fishing lure is also disclosed.

15 Claims, 12 Drawing Sheets

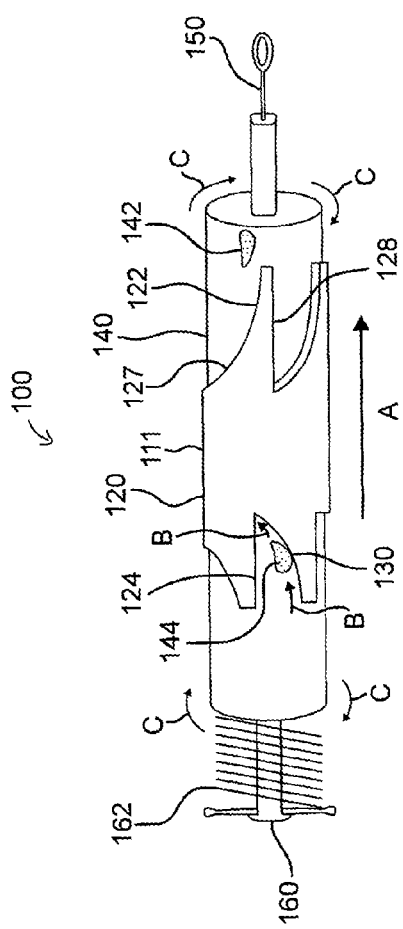
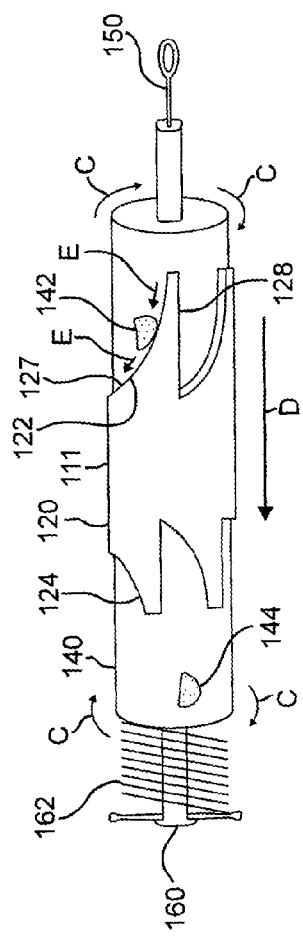

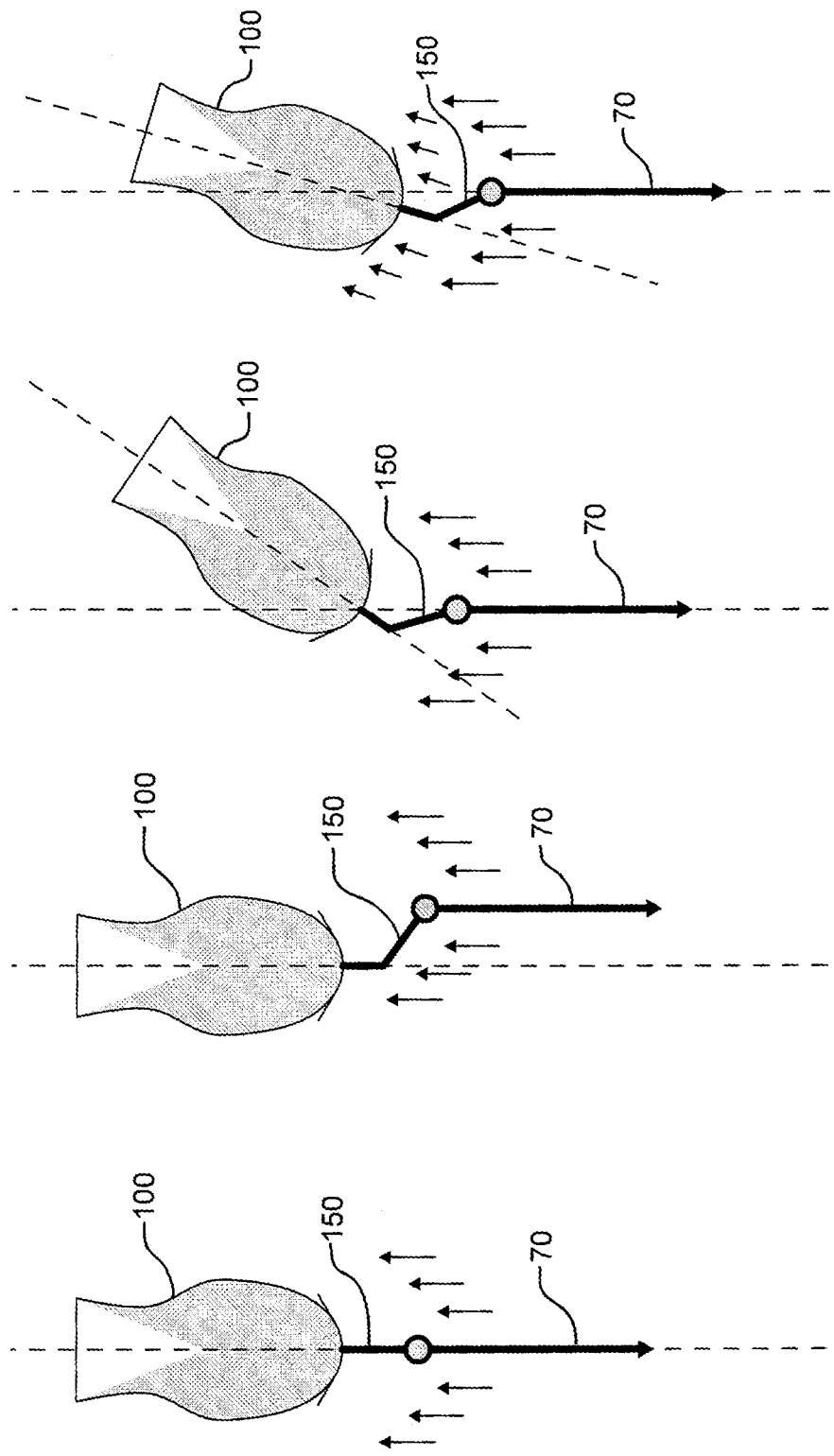

STEERABLE FISHING LURE

FIELD OF THE INVENTION

The present invention relates to a fishing lure that can be steered by a fisherman after the lure has been cast into a body of water.

BACKGROUND OF THE INVENTION

Fishing lures have appeared on the market that may be steered in either a left or a right direction as a fisherman, or "angler", pulls on the line to which the fishing lure is attached. These lures have been developed in response to an angler's desire to direct the lure to locations where fish tend to congregate, such as around trees, tree stumps, docks, rocks, or anything where they can hide to ambush prey and stay away from currents. A drawback to many of these lures, however, is that their direction change set is limited to only two directions, (i.e., left-to-right or right-to-left) or to small segments simulating constant erratic behavior with no detailed or real control by the angler while the lure is in the water.

As shown FIGS. 1A to 1C, with the direction of retrieval being from the top of the page toward the bottom of the page, a prior art lure can be retrieved in a "locally erratic" but overall straight line in the direction of retrieval (shown by the arrows in FIGS. 1A and 1B) or at alternating right or left straight line segments at an angle to the direction of retrieval (shown by the arrows in FIG. 1C) but not at a zero angle, that is, in a straightforward fashion. These prior art steerable lures are also limiting in the fact that the steerability attribute in segments of controlled length cannot be imparted, thereby reducing the effectiveness of such lures.

Furthermore, these prior art steerable lures require the line tie to stop retrieval long enough for gravitational force to effect the change in the configuration of the lure which do not allow for total reliability in the desired outcome of the direction change attempt. In other lures, while the direction of the lure may be changed if the lure is pre-adjusted prior to casting, the lure will travel at a fixed angle. Once the lure is in the water moving in one direction, ie. right the angler cannot change direction to straight ahead or to the left and therefore the lure in reality is set but not being controlled by the angler.

The need exists today for a lure that gives the angler the ability to select the direction in which the lure moves while the lure is in the water by more than two segment directions and by lengths that can be controlled by the angler at will as the lure is being dragged through the water by such angler. Furthermore the need exists for means that can confer such steerability to commercial existing lure designs without radically altering or compromising the original design integrity of such lures.

BRIEF SUMMARY OF THE INVENTION

Briefly, the present invention provides steerable lures comprising for instance a body having a longitudinal axis and a line tie rotatably coupled to the body and having a free end extending in a direction away from the longitudinal axis. The line tie is selectively rotatable between at least two predetermined positions, wherein, when the line tie is in each of the at least two predetermined positions, the body moves in a direction parallel to the direction of the free end of the line tie.

Additionally, the present invention provides a steerable fishing lure comprising a generally hollow body having an inner surface and a generally tubular cam sleeve located inside the body and fixedly attached to the inner surface. The cam sleeve has a forward cam surface and an aft cam surface. A generally cylindrical rotor is slideably inserted into the cam sleeve. The rotor has a forward cam and an aft cam. Each of the forward cam and the aft cam extends outwardly from the rotor such that the forward cam rides along the forward cam surface and the aft cam rides along the aft cam surface. A biasing member is mounted within the body. The biasing member is adapted to bias the forward cam against the forward cam surface.

Further, the present invention also provides a steerable fishing lure comprising a generally hollow body having a forward end, an aft end, and a longitudinal axis extending between the forward end and the aft end. A cam assembly is disposed within the hollow body. The cam assembly includes a line tie extending outwardly from the hollow body at the forward end. The line tie includes an axial portion extending obliquely relative to the longitudinal axis. When the cam assembly is in a first position, the line tie extends in a first direction relative to the body and, when the cam assembly is in second position, the line tie extends in a second direction relative to the body.

Additionally, the present invention also provides a method of redirecting a track of a fishing lure, the fishing lure having a secondary positioning mechanism of a direction setting lure part controlled by the linear oscillatory mechanism activated by the fishing line, the method comprising the steps of: using a fishing pole, casting the fishing lure into a body of water; and while the fishing lure is in water, dynamically readjusting the direction setting part of the fishing lure.

Also, the present invention provides a fishing lure comprising a body having a longitudinal axis and a line tie extending outwardly from the body. The line tie has a first end extending along the longitudinal axis and a second end extending obliquely away from the longitudinal axis. An oscillatory means is coupled to the first end of the line tie and adapted to move the line tie relative to the longitudinal axis such that, at a first time, the body travels in a controlled direction generally parallel to a fishing line attached to the second end and, at a second time, the body pivots relative to the fishing line and travels in a controlled direction generally oblique to the fishing line.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 10 is a perspective view illustrating an exemplary operation of the lure assembly according to the present invention, with the rotor of the lure assembly being biased in a forward direction;

FIG. 11 is a perspective view illustrating an exemplary operation of the lure assembly according to the present invention, with the rotor of the lure assembly being biased in an aft direction;

FIG. 12A is a top plan view of a lure assembly according to an exemplary embodiment of the present invention with a line tie attached to the lure being in a configuration to steer the lure in a direction co-linear with the direction in which a fishing line attached to the lure assembly is being reeled;

FIG. 12B is a top plan view of the lure assembly shown in FIG. 12A, with the line tie having been rotated 90 degrees and the lure being reeled at a first time in a direction parallel to the direction in which the fishing line is being reeled;

FIG. 12C is a top plan view of the lure assembly shown in FIG. 12B, with the lure being reeled at a second time in a direction oblique to the direction in which the fishing line is being reeled in; and FIG. 12D is a top plan view of the lure assembly shown in FIG. 12C, with the lure rotating at a third time toward the direction in which the fishing line is being reeled in.

DETAILED DESCRIPTION OF THE INVENTION

Figure 11A:
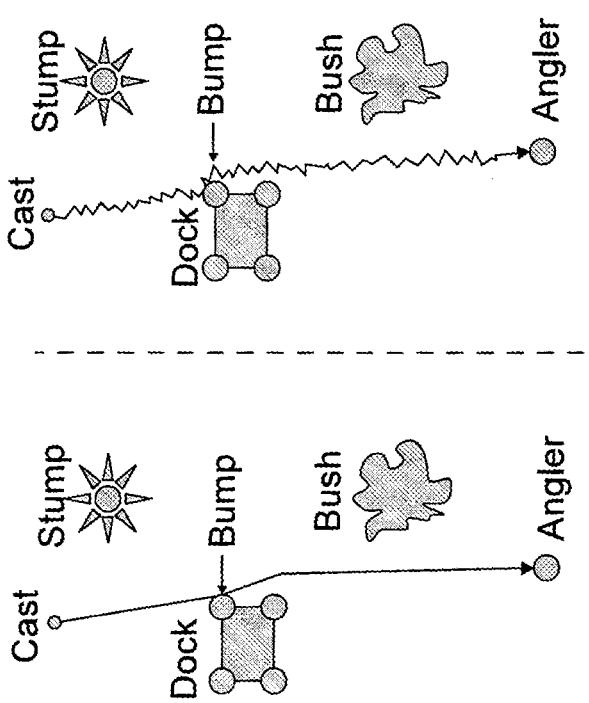
FIG. 11A is a schematic view showing the inventive lure being reeled in an exemplary multitude of different directions.

In the drawings, like numerals indicate like elements throughout. Certain terminology is used herein for convenience only and is not to be taken as a limitation on the present invention. The term forward refers to the front or mouth end of the inventive device and the term aft refers to the rear or tail end of the inventive device. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the figures, a steerable fishing lure assembly 100 according to a first exemplary embodiment of the present invention is shown. Lure assembly 100 includes an internal linear oscillating, or reciprocating, mechanism that allows an angler to redirect the direction in which a lure "swims" as the angler reels in the lure after a cast. As the angler is reeling in the lure, depending upon configuration of the lure assembly, the fishing lure in which the inventive lure assembly is contained can track at an angle to the left or right relative to the direction in which the lure is being reeled. Alternatively, the inventive lure assembly can be configured within the lure to reel in the lure in the direction in which the lure is being reeled, but also causing the lure to "dive" deeper into the water or to rise toward the surface of the water.

At any given time of the day fish are most likely to strike lures that are reeled at a specific "optimum" speed for specific contexts (current configuration, time of day and other context variables). If one changes the time or any other context variable, then the optimum lure speed for fishing changes. Therefore, effectiveness of fishing performance increases when both factors speed and steerability are used simultaneously. Experienced anglers usually find the optimum speed by testing several speeds over the full range of reeling speeds. For a given context, the speeds at which the fish are biting could be ¼, ½, ¾ of full reel speed or anything in between. Once optimum speed is found, the anglers want to be able to control the lure's track as close as possible to that optimum speed. If the optimum speed is not within such small range, the angler cannot use effectively the steerability of the lure. This reduces the overall fishing effectiveness or fishing performance of such lures. Lure assembly 100 according to the present invention, however, allows the angler to reel at any speed between zero and full reel speed.

Figure 2:
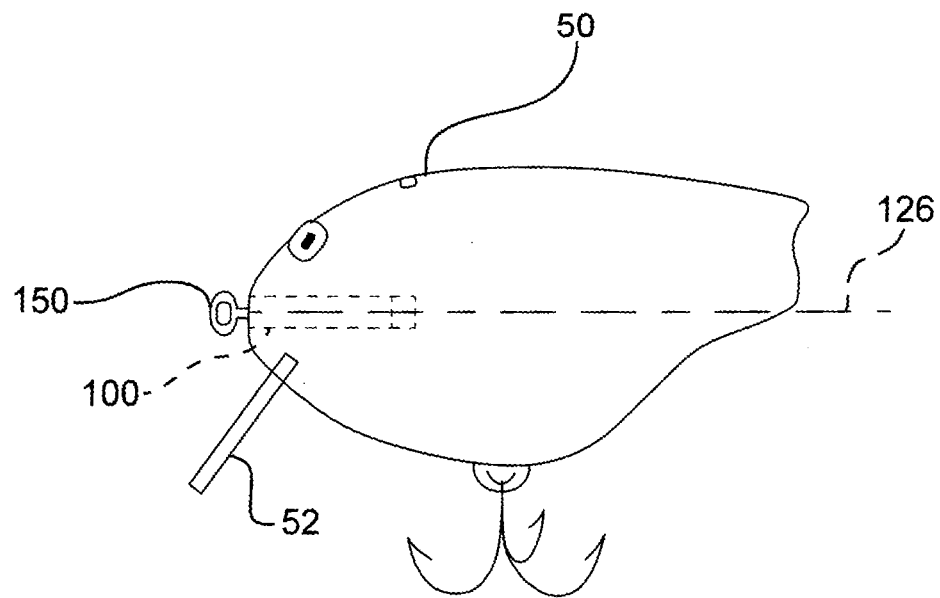
FIG. 2 is an exemplary embodiment of a lure assembly according to the present invention being fixedly inserted into a lure.
Figure 3:
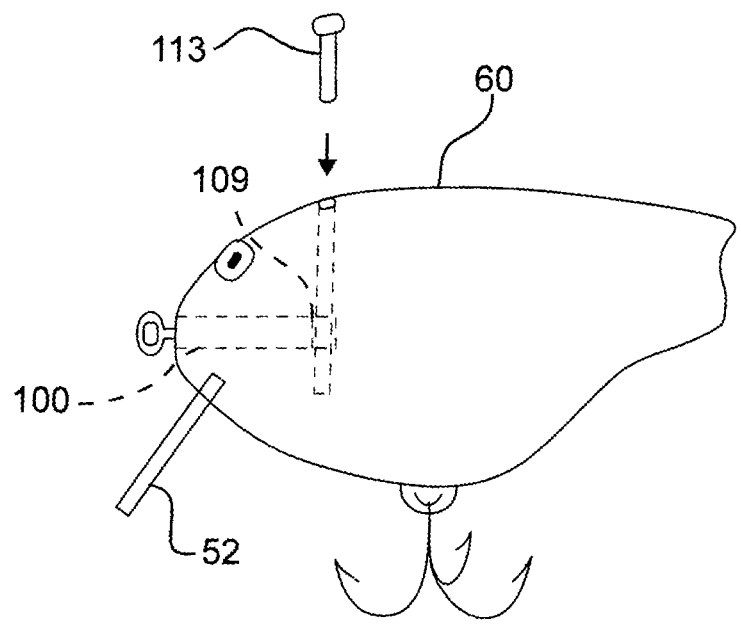
FIG. 3 is exemplary embodiment of a lure assembly according to the present invention being removably inserted into a lure.

As shown FIG. 2, lure assembly 100 may be permanently incorporated into a fishing lure 50 or, alternatively, as shown FIG. 3, lure assembly 100 may be removably inserted into a fishing lure 60. Each of lure 50, 60 includes a front lip 52 that stabilizes lure 50, 60 and maintains lure 50, 60 in a generally "upright" position, as shown in FIGS. 2 and 3, respectively. Front lip 52 is also used to assist in causing lure 50 to dive deeper into the water as lure 50 is being reeled in.

Figure 4:
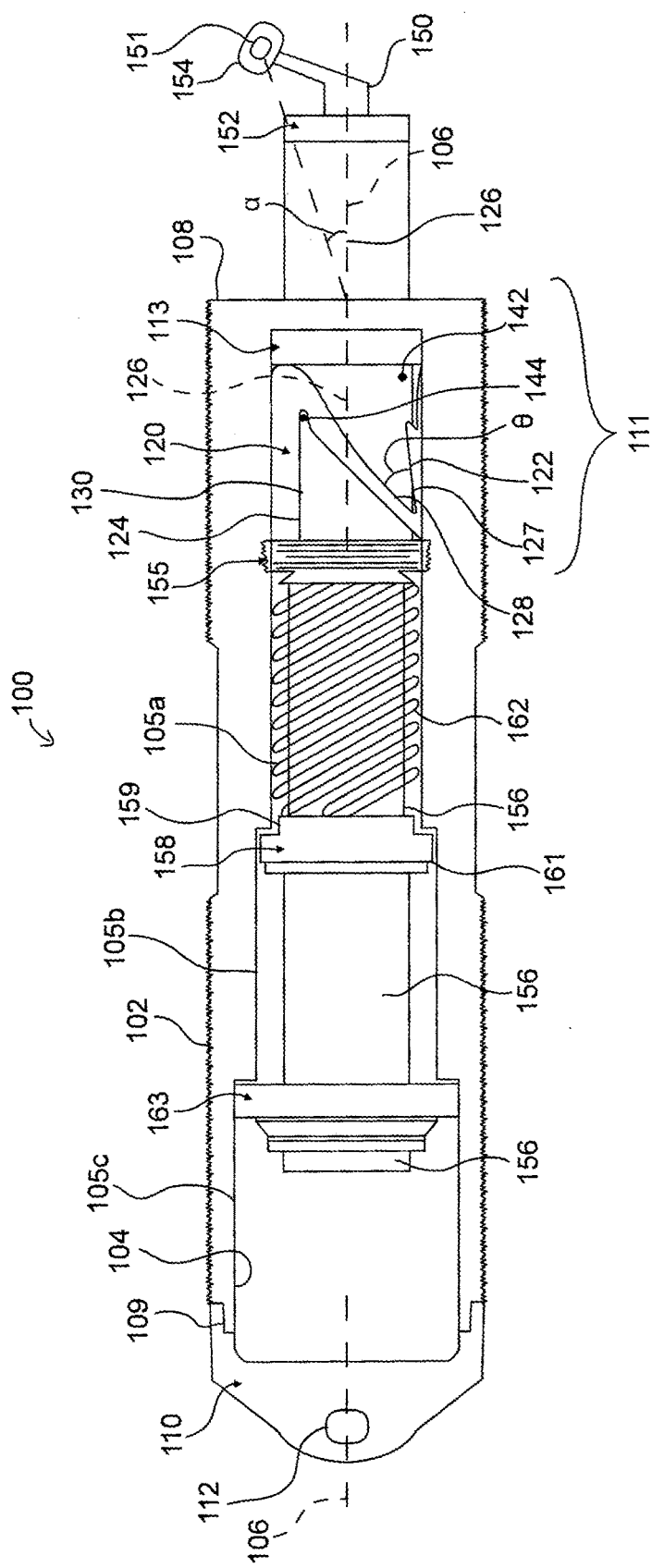
FIG. 4 is a cross-sectional view of an exemplary embodiment of a lure assembly according to the present invention with an internal biasing member in a compressed condition.
Figure 5:
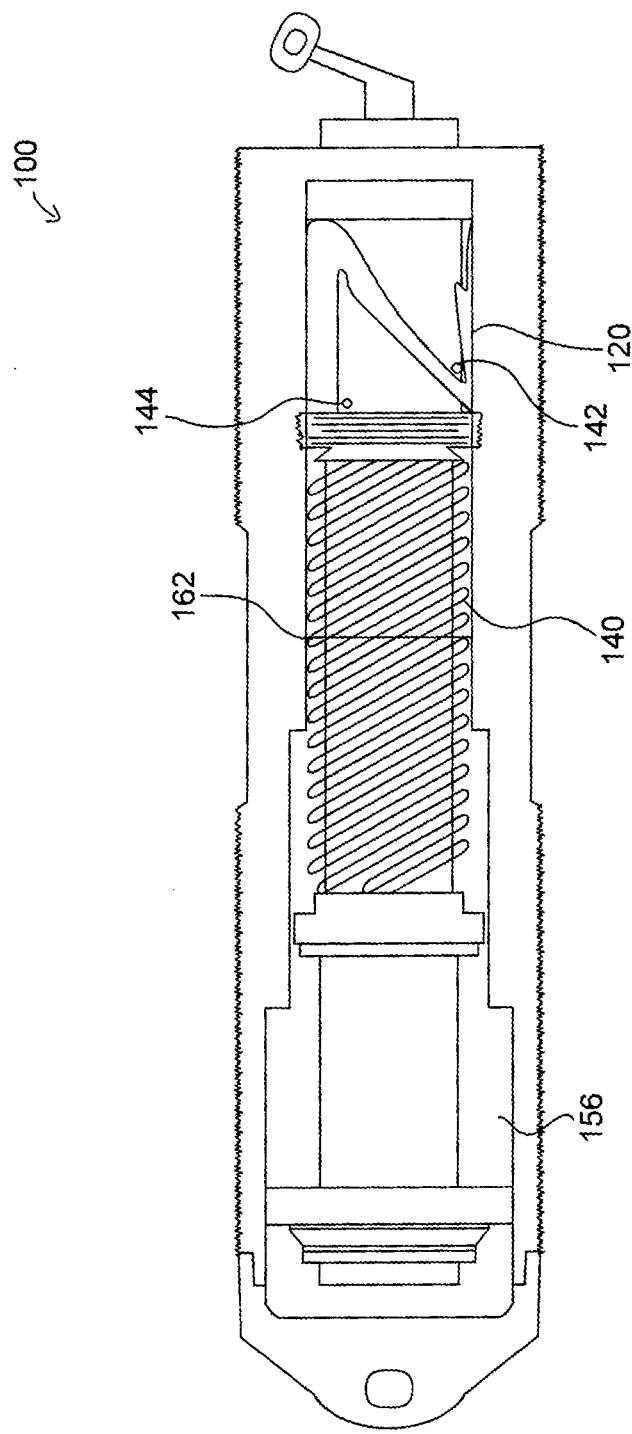
FIG. 5 is a cross-sectional view of the lure assembly of FIG. 4, with the biasing member in an expanded condition.

As shown FIGS. 4 and 5, lure assembly 100 includes a generally hollow body 102 having an inner surface 104. A longitudinal axis 106 extends through body 102. Body 102 includes a forward end 108 and an aft end 110 disposed distally from forward end 108. Body 102 is generally tubular in shape. Alternatively, body 102 can be other shapes, such as, but not limited to, rectangular, hexagonal, etc.

In an exemplary embodiment, not shown, body 102 may be single piece. Alternatively, as shown FIG. 4, body 102 may consist of separate forward end 108 and aft end 110 with a connection 109 that releasably joins forward end 108 with aft end 110. Connection 109 may be a threaded connection. In either embodiment, body 102 may be constructed from a polymer (such as HIPS, nylon, acetal), a light metal (such as brass or aluminum), a composite (such as carbon fiber, reinforced epoxy), or other suitable material.

If lure assembly 100 is to be removably installed into a lure, such as for example lure 60 shown FIG. 3, body 102 includes a generally tubular opening 109 that is sized to receive a connector, such as, for example, bolt 113, that can be slid through lure 60 and tubular opening 109 to secure lure assembly 100 to lure 60. While bolt 113 is shown as extending vertically in FIG. 3, those skilled in the art will recognize that opening 109 and bolt 113 can extend in other directions as well.

Referring back to FIG. 4, a cam assembly 111 is used to manipulate the direction of body 102 as lure assembly 100 is being dragged through the water. Cam assembly 100 includes a plurality of cams that are mounted on a rotor and engage a cam sleeve such that operation of cam assembly 111 rotates the rotor. Cam assembly 111 allows a rotor to oscillate, or reciprocate, along a linear axis, depending on whether lure assembly 100 is being reeled in under tension or if lure assembly 100 is in a relaxed mode. The rotor engages cams in cam assembly 111 that rotate the rotor about the linear axis, thereby manipulating a line tie extending outwardly from the lure assembly.

A generally tubular cam sleeve 120 located inside body 102 and is fixedly attached to inner surface 104. Cam sleeve 120 can be manufactured separate from body 102 and inserted into body 102 during manufacture of lure assembly 100. Alternatively, cam sleeve 120 can be manufactured as part of body 102.

Cam sleeve 120 has a forward cam surface 122, an aft cam surface 124, and a longitudinal axis 126. In an exemplary embodiment, longitudinal axis 126 is collinear with body longitudinal axis 106. Forward cam surface 122 has a first forward face 127 that extends generally parallel to longitudinal axis 126. Cam sleeve 120 further has a second forward face 128 that extends at an oblique angle θ relative to longitudinal axis 126. In an exemplary embodiment, θ may be between about 30° and about 60°. In another exemplary embodiment, second forward face 128 extends about 180° around cam sleeve 120. Aft cam surface 124 has a first aft face 130 extending generally parallel to first forward face 127.

Figure 6:
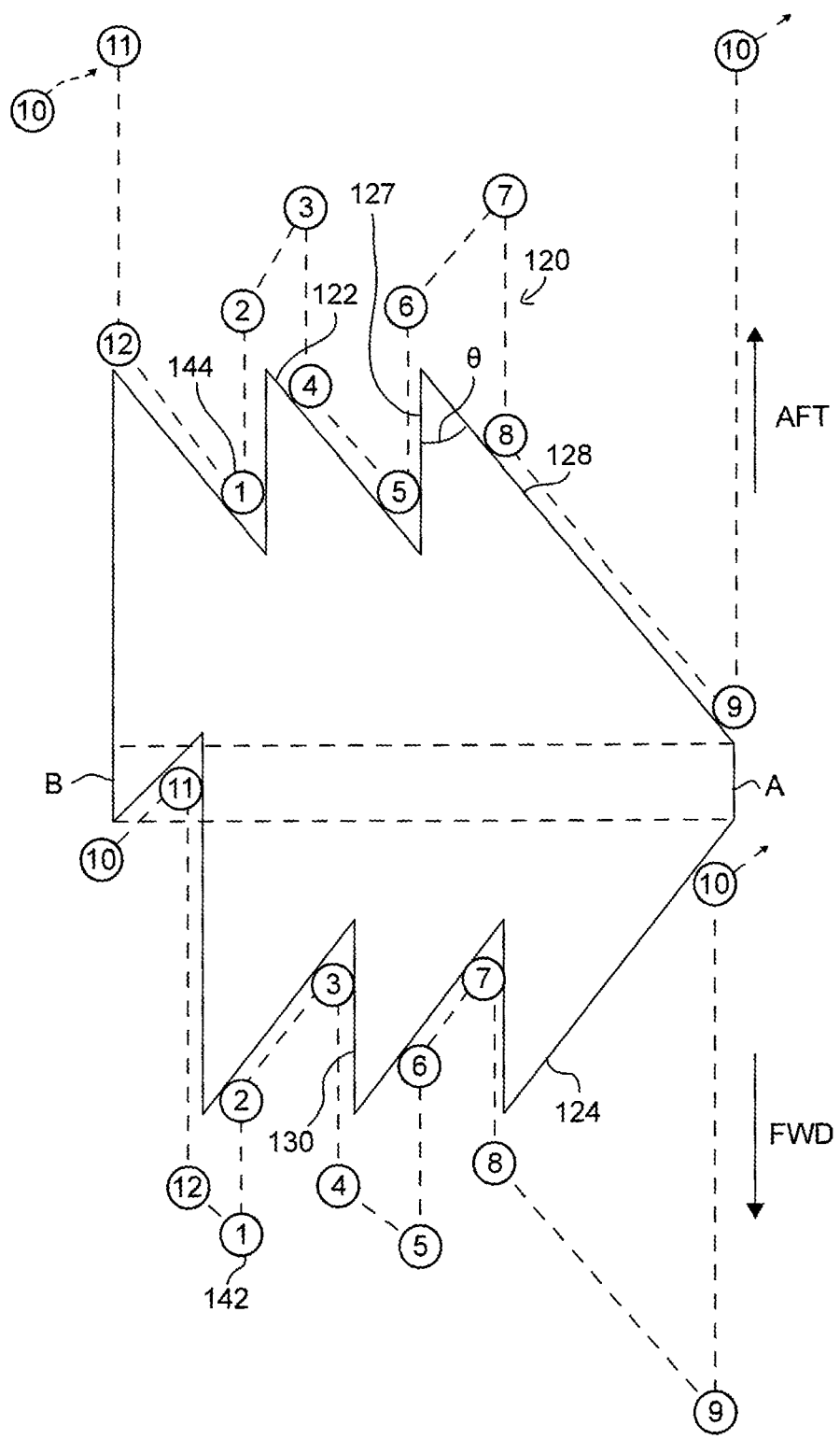
FIG. 6 is a two-dimensional representation of an exemplary cam sleeve used with the lure assembly of FIG. 4.

Forward cam surface 122 and aft cam surface 124 may have different configurations, depending upon the desired axial rotation of cam sleeve 120 during operation of lure assembly 100. In a first exemplary configuration of cam sleeve 120, shown FIG. 6, a cam sleeve 120 that generates a 180° rotation combined with two 90° rotations has been cut longitudinally and laid flat in the plane of the paper of FIG. 6. To make cam sleeve 120, side "A" is matched up along the dashed lines with side "B". Longitudinal axis 126 (not shown in FIG. 6) extends generally parallel to the "FWD" and "AFT" arrows shown in FIG. 6. Cam sleeve 120 allows lure assembly 100 to move to the left, straight (vertically up or down), and to the right as lure assembly 100 is reeled in by the angler.

Figure 6A:
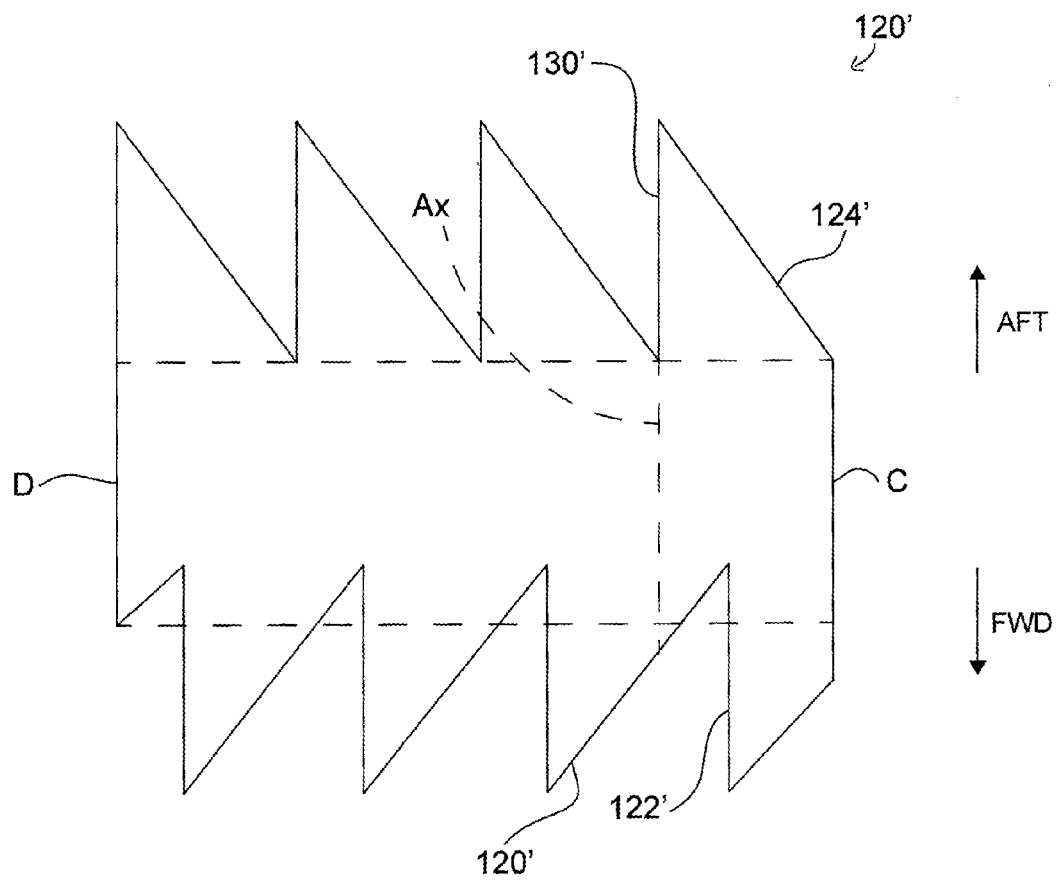
FIG. 6A is a two dimensional representation of an alternative exemplary cam sleeve use with the lure assembly of FIG. 4.

In a second exemplary configuration of a cam sleeve 120', shown FIG. 6A, cam sleeve 120' that generates four 90° rotations has been cut longitudinally and laid flat in the plane of the paper of FIG. 6A. To make cam sleeve 120', side "C" is matched up along the dashed lines with side "D". Longitudinal axis 126 (not shown in FIG. 6A) extends generally parallel to the "FWD" and "AFT" arrows shown in FIG. 6A. Cam sleeve 120' allows lure assembly 100 to move to the left, straight (vertically up), to the right, and straight (vertically down) as lure assembly 100 is reeled in by the angler. In this particular configuration, aft cam surface 124' has a first aft face 130' extending generally parallel to first forward face 122' and first aft face 130' extends along an axis "AX" such that axis "AX" generally bisects second forward face 128'.

A generally cylindrical rotor 140 is slideably inserted into cam sleeve 120. Rotor 140 has a forward cam 142 and an aft cam 144. Each of forward cam 142 and aft cam 144 extends outwardly from rotor 140 such that forward cam 142 rides along forward cam surface 122 and aft cam 144 rides along aft cam surface 124. Rotor 140 rotates within cam sleeve 120 to adjust the direction in which lure assembly 100 travels as it is being reeled in by an angler.

Figure 8:
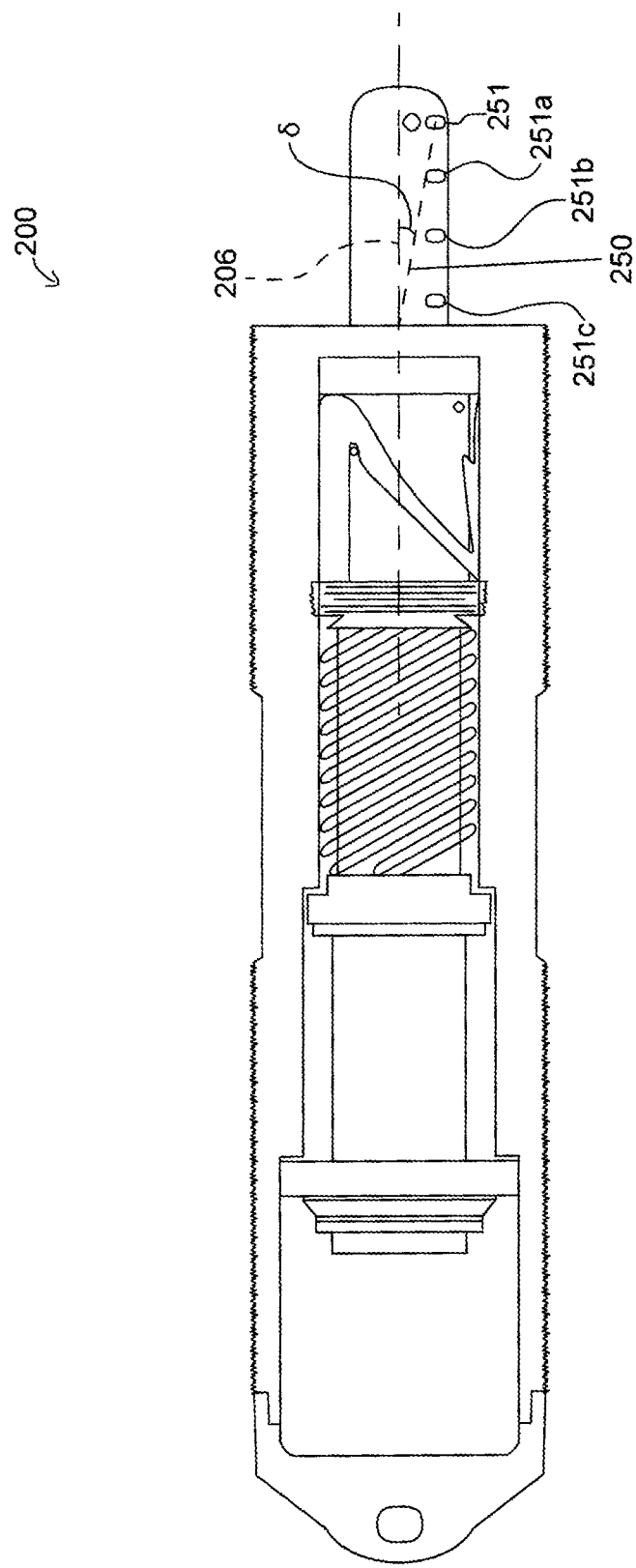
FIG. 8 is a cross-sectional view of an alternative exemplary embodiment of a lure assembly according to the present invention.
Figure 9:
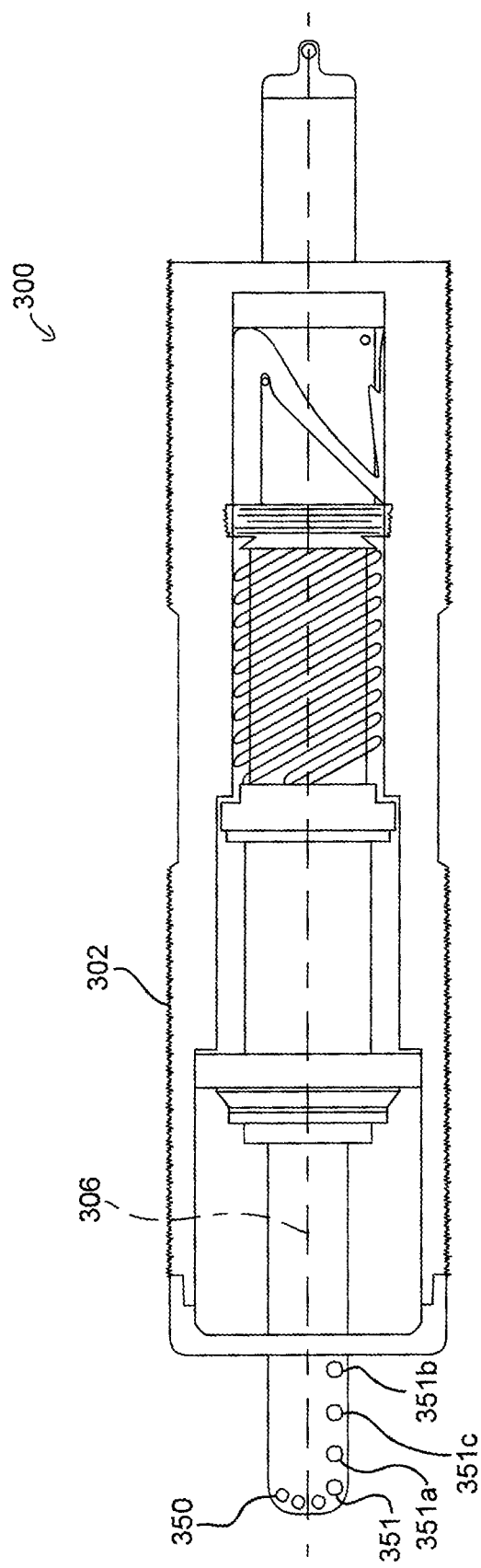
FIG. 9 is a cross-sectional view of another alternative exemplary embodiment of a lure assembly according to the present invention.

As shown FIGS. 8 and 9, each of forward cam 142 and aft cam 144 may include contoured sides that match the face of cam sleeve 120 against which the side of the cam engages. For example, first forward face 127 is a generally straight face, so the matching side of forward cam 142 that engages first forward face 127 is also generally straight. Second forward face 128 is a generally curved face, so the matching side of forward cam 142 that engages second forward face 128 is generally curved as well. Those skilled in the art, however, will recognize that the sides of forward cam 142 and aft cam 144 that engage cam sleeve 120 may be other shapes as well.

Referring back to FIG. 4, a line tie 150 has a first end 152 fixedly attached to rotor 140 and extending co-linearly with body axis 106. Line tie 150 also has a free, or second, end 154 extending outwardly from body 102. Second end 154 extends obliquely away from body axis 106. Line tie 150 is selectively rotatable about body axis 106 such that, when cam assembly 111 is in a first position, line tie 150 extends in a first predetermined position relative to body 102 and, when cam assembly 111 is in second position, line tie 150 extends in a second predetermined position relative to body 102. In an exemplary embodiment, the first predetermined position is diametrically opposed to the second predetermined position across longitudinal axis 126. Body 102 may include a seal 112 around line tie 150 where line tie 150 exits body 102 in order to reduce the amount of water and/or debris entering body 102. Optionally, a grease, poly silicone or other water-proof lubricant (not shown) may be applied to cam sleeve 120 to facilitate operation of cam assembly 111.

The direction of line tie 150 extending outwardly from body 102 plays a large role in the direction that lure 50 travels as the angler reels in lure 50. For example, as shown FIG. 7A, if line tie 150 is angled the left with respect to lure 50, lure 50 will tend to track to the left as lure 50 is reeled in. If line tie 150 is angled to the right with respect to lure 50, as shown in FIG. 7B, lure 50 will tend to track to the right as lure 50 is reeled in. If line tie 150 is centered with respect to lure 50, as shown FIG. 7C, lure 50 will tend to track straight as lure 50 is reeled in. In general, body 102 (and lure 50) moves in a direction that is parallel to the direction of free end 154.

Also, while line tie 150 is shown in FIG. 2 as extending from a forward end of lure 50, those skilled in the art will recognize that line tie 150 can extend from other parts of lure 50, such as, for example the top of lure 50.

A shaft 156 extends afterward from rotor 140. Body 102 includes a baffle 158 having an opening 159 such that shaft 156 extends through opening 159. Shaft 156 also includes an aft stop 160.

A biasing member 162 is mounted within body 102 around shaft 156 between aft stop 160 and baffle 158 and biases rotor 140 toward aft end 110 of body 102, resulting in the biasing of line tie 150 toward body 102. Biasing member 162 is adapted to bias rotor 140 toward the aft end of body 102 such that forward cam 142 is biased against forward cam surface 122. In an exemplary embodiment, biasing member 162 may be a helical spring. Alternatively, biasing member 162 may be a pair of magnets disposed apart from each other such that like poles are facing each other, thereby tending to repel the magnets from each other.

Optionally, a forward washer 164 and an aft washer 166 may be disposed on either side of biasing member 162 to help distribute the force imparted by biasing member 162 when biasing member 162 is in compression. Further, washers 164, 166 help reduce the likelihood of biasing member 162 rotating torsionally as rotor 140 rotates. Such torsional rotation may restrict the rotation of rotor 120. Additionally, a sliding baffle 168 may be disposed at aft stop 160 to help center shaft 156 within body 102. Sliding baffle 168 is not fixed to body 102, but slides along the interior of body 102 as rotor 140 moves along cam sleeve 120.

Cam assembly 111 is operated by tension cycles applied to lure 50 as lure is being reeled in. Intermittent reeling and cessation of reeling results in line tie 150 moving in a direction along longitudinal axis 106, causing line tie 150 and rotor 140 successively revolving about longitudinal axis 126 at predetermined angles to predetermined positions, which in turn, cause lure 50 to move in a specific direction (i.e., right, left, or straight). Rapid successive tension cycles can mimic what looks like sudden changes in direction of lure 50, which triggers fish to a reaction hunting strike on lure 50.

Figure 12:
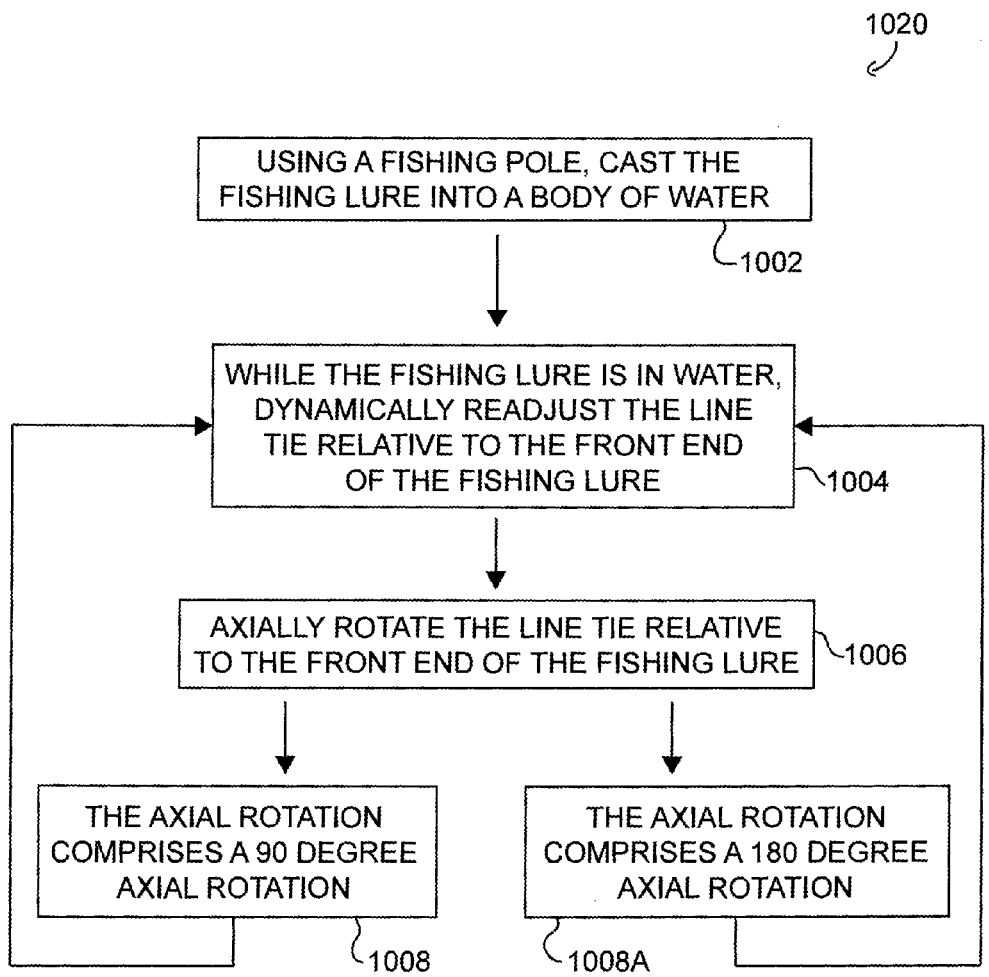
FIG. 12 is a flowchart illustrating an exemplary operation of floor assembly according to the present invention.

Referring now to FIGS. 10 and 11 and flowchart 1000 in FIG. 12, in order to use lure assembly 100, in step 1002, using a fishing pole, lure 50 or lure 60, depending on whether lure assembly 100 is fixedly connected to lure 50 or removably connected to lure 60, is cast into a body of water using a fishing rod. In step 1004, while lure assembly 100 is in the water, in step 1004, the angler dynamically readjusts line tie 150 relative to the front end of the fishing lure 50, 60 by axially rotating line tie 150 relative to the front end of fishing lure 50, 60. For simplicity of the below discussion, only fishing lure 50 will be discussed, and fishing lure 50 and body 102 will not be shown for clarity.

As the angler reels in lure 50 by pulling on lure assembly 100 in the direction of arrow "A", as shown FIG. 10, hydraulic drag on fishing lure 50 pulls rotor 140 farther than cam sleeve 120, activating cam assembly 111 so that forward cam 142 is pulled away from cam sleeve 120 and aft cam 142 is pulled into cam sleeve 120 in the direction of arrow "B". The movement of rotor 140 with respect to cam sleeve 120 compresses biasing member 162. In step 1006, as aft cam 144 engages aft first face 130 of cam sleeve 120, aft cam 142 rides along aft first face 130, rotating rotor 140 in the direction of arrows "C" and thereby rotating line tie 150 as well and readjusting line tie 150 relative to the front end of lure 50. Lure 50 maintains its upright position so that line tie 150 rotates about longitudinal axis 126 with respect to lure 50.

When the angler ceases reeling in lure 50, biasing member 162 expands, as shown in FIGS. 5 and 11, drawing rotor 140 rearward with respect to cam sleeve 120 in the direction of arrow "D", as shown in FIG. 11. Aft cam 144 is pulled away from cam sleeve 120 and forward cam 142 engages forward first face 127 of cam sleeve 120 and rise along forward first face 127, continuing to rotate rotor 140. In the direction of arrows "C" and thereby rotating line tie 150 as well.

The amount of rotation of rotor 140 with respect to cam sleeve 120 for each jerk of the rod depends on the particular geometric configuration of forward cam surface 122 and aft cam surface 124 and the location of forward cam 142 and aft cam 144 on rotor 140. In step 1008, if cam sleeve 120 is used, two rotations of line tie 150 are each about 90 degrees, and a third rotation of line tie 150 is about 180 degrees, such that line tie 150 is able to rotate 360 degrees about longitudinal axis 106. In step 1008A, if cam assembly 120' is used, each axial rotation of line tie 150 is about 90 degrees.

The direction and movement of line tie 150 with respect to lure 50 directly correlates to the direction in which lure assembly 100 moves as lure 50 is pulled/reeled in by the angler and rotor 140 rotates as result of the interaction of cams 142, 144, with cam sleeve 120.

Figure 7C:
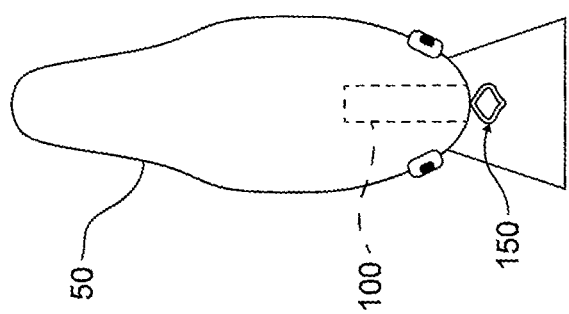
FIG. 7C is a top plan and view of the lure of FIG. 2, with the line tied directed to steer the lure in a straight direction.
Figure 7B:
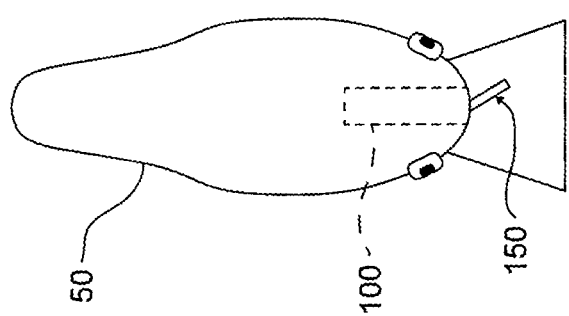
FIG. 7B is a top plan view of the lure of FIG. 2, with the line tie directed to steer the lure in a right direction.
Figure 7A:
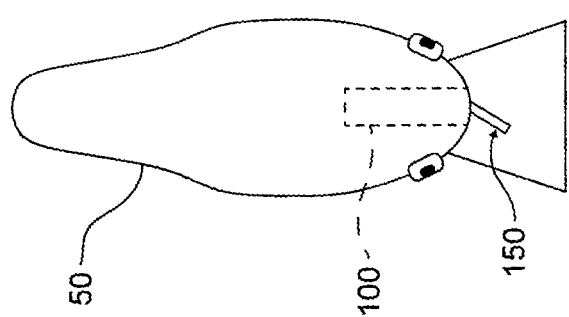
FIG. 7A is a top plan view of the lure of FIG. 2, with a line tie directed to steer the lure in a left direction.

For example, referring to FIG. 6 and FIGS. 7A-7C, with forward cam 142 and aft cam 144 each in the position relative to cam sleeve 120 identified by circled "1" (position 1) and following the movement of each of forward cam 142 and aft cam 144 from position 1 to position 12 and back to position 1 as lure assembly 100 is manipulated by the angler, going from position 1 to position 5 rotates line tie 150 from the position shown in FIG. 7C, causing lure assembly 100 to "swim" along a first track, such as, for example, straight and downward, to the position shown in FIG. 7A, causing lure assembly 100 to "swim" along a second track, such as, for example, to the left. Going from position 5 to position 9 rotates line tie 150 from the position shown in FIG. 7A to the position shown in FIG. 7B, causing lure assembly 100 to "swim" along the third track, such as, for example, to the right. Going from position 9, through position 12 and back to position 1 rotates line tie 150 from the position shown in FIG. 7B to the position shown FIG. 7C.

Figure 1C:
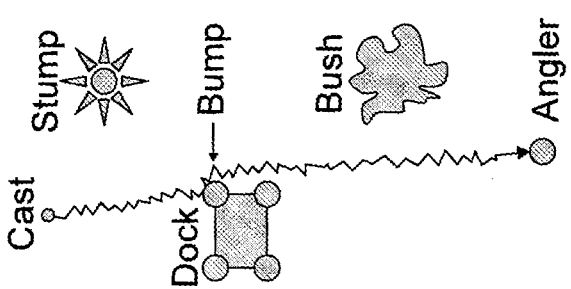
FIG. 1C is a schematic view showing a prior art lure being reeled with a gravitational acting mechanism in which there is only one direction change possible at each turning point.
Figure 1B:
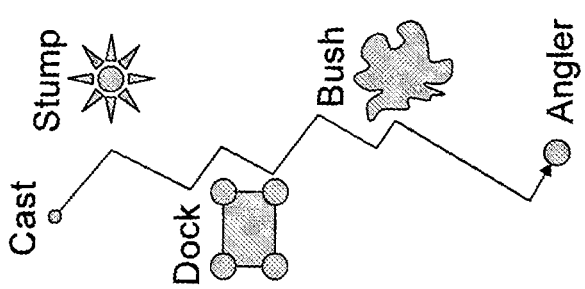
FIG. 1B is a schematic view showing a prior art lure being reeled in a straight direction but with "short range pseudo-erratic" direction changes.
Figure 1A:
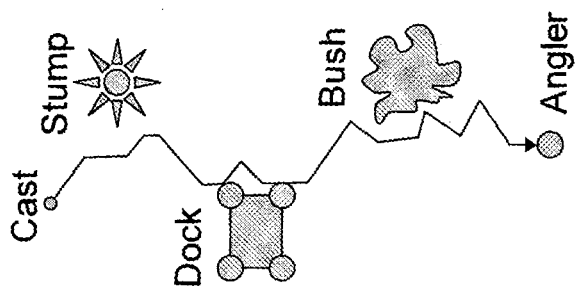
FIG. 1A is a schematic view showing a prior art lure being reeled in a straight direction.

Operation of lure assembly 100 can provide the manipulation of lure 50 along an exemplary track such as the track shown in FIG. 11A, which, compared to the tracking either of prior art FIG. 1A or 1B, provides a more realistic track that may be more likely to lure fish into striking lure 50.

Another exemplary method of operation of lure assembly 100 is shown in FIGS. 12A-12D. FIG. 12A shows lure assembly 100 with line tie 150 attached to body 102 being in a configuration to steer lure assembly 100 in a direction co-linear with the direction in which a fishing line 70 attached to lure assembly 100 is being reeled. By way of example only, line tie 150 can be configured to direct lure assembly 100 in an upward direction (toward the surface of the water) or in a downward direction (away from the surface of the water). FIG. 12B shows lure assembly 100 with line tie 150 having been rotated 90 degrees and lure assembly 100 being reeled at a first time in a direction parallel to the direction in which fishing line 70 is being reeled. FIG. 12C shows lure assembly 100 rotating at a second time a direction oblique to the direction in which fishing line 70 is being reeled in. FIG. 12D shows lure assembly 100 rotating at a third time toward the direction in which fishing line 70 is being reeled in.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of redirecting a track of a fishing lure on a fishing line, the fishing lure having a body and a re-positioning mechanism inside the body, the mechanism being activated by the fishing line, the method comprising the steps of:
   (a) using a fishing pole, casting the fishing lure into a body of water, the fishing lure having a body, a fishing lure longitudinal axis extending along a length of the body, and a line tie extending outwardly from the body; and
   (b) while the fishing lure is in the water, pulling on the fishing line;
   (c) after step (b), ceasing to pull on the fishing line and activating the re-positioning mechanism, wherein
   wherein the line tie is rotatable 360 degrees about the fishing lure longitudinal axis and with respect to the fishing lure body; thereby
   (e) changing a direction of travel of the fishing lure.

2. The method according claim 1, wherein the re-positioning mechanism comprises a cam mechanism located inside the body, the cam mechanism being operatively connected to the line tie, and wherein the method further comprises activating the cam mechanism to rotate the line tie about the fishing lure longitudinal axis.

3. The method according to claim 2, wherein the step of pulling on the fishing line activates the cam mechanism.

4. The method according to claim 1, wherein the re-positioning mechanism comprises a rotor assembly located in the fishing lure, the rotor assembly being operatively coupled to the line tie, and wherein the step of pulling on the fishing line comprises rotating the rotor assembly inside the fishing lure.

5. The method according to claim 4, wherein the step of pulling on the fishing line further comprises translating the rotor assembly along the fishing lure axis.

6. The method according to claim 1, wherein the line tie is fixedly connected to a rotor, and wherein the step of pulling on the fishing line rotates the rotor.

7. The method according to claim 6, wherein the step of pulling on the fishing line rotates the rotor from a first predefined position to a second predefined position.

8. The method according to claim 7, wherein the step of pulling on the fishing line rotates the rotor about 90 degrees.

9. The method according to claim 1, wherein the direction of travel is parallel to a direction of the line tie relative to the fishing lure axis.

10. The method according to claim 9, further comprising repeating steps (b) and (c), thereby rotating the line tie about 90 degrees about the fishing lure axis.

11. The method according to claim 10, wherein the first travelling direction is left of the longitudinal axis and wherein the second travelling direction is right of the longitudinal axis.

12. A method of redirecting a track of a fishing lure on a fishing line, the fishing lure having a re-positioning mechanism located entirely within the fishing lure and activated by the fishing line, the method comprising the steps of:
    (a) using a fishing pole, casting the fishing lure into a body of water, the fishing lure having a body, a fishing lure longitudinal axis extending along a length of the body, and a line tie attached to the re-positioning mechanism and extending outwardly from the body and having a free end extending in a first direction oblique relative to the longitudinal axis; and
    (b) while the fishing lure is in the water, pulling on the fishing line, causing the fishing lure to travel in a first travelling direction;
    (c) after step (b), releasing tension on the fishing line and activating the re-positioning mechanism, thereby moving the line tie such that the free end extends in a second direction oblique to the longitudinal axis and such that the free end of the line tie remains in the second direction; and
    (d) changing a direction of travel of the fishing lure to a second travelling direction.

13. The method according to claim 12, wherein the first travelling direction is the same as the first direction and wherein the second travelling direction is the same as the second direction.

14. The method according to claim 12, further comprising the steps of:
    (e) after step (d), ceasing to pull on the fishing line and activating the re-positioning mechanism, thereby moving the line tie such that the free end extends in a third direction oblique to the longitudinal axis; and
    (f) changing a direction of travel of the fishing lure to a third travelling direction.

15. A method of redirecting a track of a fishing lure on a fishing line, the fishing lure having a re-positioning mechanism located entirely within the fishing lure and activated by the fishing line, the method comprising the steps of:
    (a) using a fishing pole, casting the fishing lure into a body of water, the fishing lure having a body, a fishing lure longitudinal axis extending along a length of the body, and a line tie attached to the re-positioning mechanism and extending outwardly from the body; and
    (b) while the fishing lure is in the water, pulling on the fishing line;
    (c) after step (b), releasing tension on the fishing line and activating the re-positioning mechanism, thereby
    (d) cycling the line tie between a first position on a first side of the fishing lure longitudinal axis and a second position on a second side of the fishing lure longitudinal axis; and
    (e) changing a direction of travel of the fishing lure to a first direction when the line tie is in the first position and to a second direction when the line tie is in the second position.

* * * * *